United States Patent
Wagner et al.

(10) Patent No.: US 7,830,685 B2
(45) Date of Patent: Nov. 9, 2010

(54) METHOD MODULAR POWER SUPPLY FOR X-RAY TUBES AND METHOD THEREOF

(75) Inventors: Bernhard Wagner, Hamburg (DE); Bernd Freiheit-Jensen, Hamburg (DE); Christian Vollertsen, Hamburg (DE); Christoph Loef, Aachen (DE); Cornelius Paul, Hamburg (DE); Frank Mueller, Hamburg (DE); Klaus Hoffmann, Hamburg (DE); Marc Klingelhoeller, Hamburg (DE); Wolfgang Rexhausen, Thomasburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 610 days.

(21) Appl. No.: 11/814,680

(22) PCT Filed: Jan. 26, 2006

(86) PCT No.: PCT/IB2006/050278
§ 371 (c)(1), (2), (4) Date: Jul. 25, 2007

(87) PCT Pub. No.: WO2006/079985
PCT Pub. Date: Aug. 3, 2006

(65) Prior Publication Data
US 2008/0130323 A1 Jun. 5, 2008

(30) Foreign Application Priority Data
Jan. 28, 2005 (EP) .................................. 05100569

(51) Int. Cl.
*H02J 3/46* (2006.01)
*H02J 3/48* (2006.01)
*H02J 3/50* (2006.01)

(52) U.S. Cl. ...................... 363/65; 363/17; 363/21.02
(58) Field of Classification Search ............ 363/16–19, 363/21.02, 21.07, 21.09, 21.1, 65, 67, 69, 363/70, 71
See application file for complete search history.

(56) References Cited

U.S. PATENT DOCUMENTS

| 3,477,010 A * | 11/1969 | Nard ............................ 363/43 |
| 2002/0067631 A1 | 6/2002 | Lunding et al. |
| 2002/0070718 A1 | 6/2002 | Rose |

FOREIGN PATENT DOCUMENTS

| JP | 050019091 | 6/1973 |
| JP | 05029091 | 2/1993 |
| WO | 0137416 | 5/2001 |

* cited by examiner

*Primary Examiner*—Gary L Laxton
*Assistant Examiner*—Nusrat J Quddus

(57) ABSTRACT

A power supply power supply (30) comprising a DC voltage supply, a control unit and a plurality of high voltage channels (33a-33d) is suggested. Each high voltage channel (33) includes an inverter (IKTV), a resonance circuit, a transformer (TR), and a rectifier (RECT). The resonance circuit cooperates with the inverter (INV). The inverter (INV) is formed by a first switching unit and a second switching unit whereby a voltage of a first polarity can be applied to the resonance circuit in a first switching state, whereas a voltage of a second polarity can be applied to the resonance circuit in a second switching state. The switching states can be switched by the control unit in such a manner that in a first mode of an operation for high output power, the output power can be adjusted by changing the switching frequency in the range of the resonance frequency. In a second mode of operation for low output power, the output power can be adjusted by changing the duration of the switching state at an essentially constant switching frequency.

9 Claims, 5 Drawing Sheets

METHOD MODULAR POWER SUPPLY FOR X-RAY TUBES AND METHOD THEREOF

FIELD OF THE INVENTION

According to a first aspect, the invention is related to a power supply. More particularly the invention is related to a power supply for an x-ray source.

BACKGROUND OF THE INVENTION

For supplying an x-ray tube with energy DC voltage sources with high output voltages are required. For medical applications the acceleration voltage for an x-ray tube is in the range between 15 kV and 160 kV. For industrial applications the acceleration voltage may go up to 400 kV. During the operation the x-ray tube is supplied with power at a few Volts up to 100 kV.

In the prior art power supplies for x-ray tubes having resonance circuit converter topologies are known. Their common principle is to rectify the mains voltage, to smoothen it and to provide it subsequently to a DC/AC converter operating at a high frequency. The DC/AC converter supplies a high voltage transformer with a high frequent AC current. In this way the high voltage transformer forms a high frequent AC current source with a high output voltage. After rectifying and smoothening this voltage, it is provided to the electrodes of the x-ray tube.

The difficulties related to the generation and isolation of high voltages are usually alleviated by dividing the full voltage into two partial voltages having approximately similar maximum values. In general, common potential of the two partial voltages is usually connected to ground. According to this concept for the insulation of a voltage of 150 kV two separate insulation paths against ground are needed. One insulation path insulates +75 kV against ground and the other one −75 kV against ground.

However, for some x-ray application it is desirable to build up the full DC high voltage against ground. In this way it is possible to keep the cathode of the x-ray tube close to ground potential and the anode for example at 120 kV or vice versa. This kind of application calls for a unipolar high voltage supply allowing keeping one electrode of the x-ray tube at the maximum DC voltage whereas the other electrode of the x-ray tube is close to ground potential.

In WO 01/37416 A2 a unipolar power supply with an inverter is disclosed. The power supply has an inverter, which cooperates with a resonance circuit and can be controlled so as to adjust the output power by means of a control unit. The control unit switches the power supply between low and high output power ranges.

In JP 05029091 another type of a high voltage power supply is described. The power supply comprises a plurality of resonant inverter circuits connected in parallel to a DC power supply. A control unit outputs control voltages of variable frequencies to adapt the output power of the high voltage power supply.

SUMMARY OF THE INVENTION

It is an object of the present invention to suggest a power supply having a large output power range, particularly suitable for the low output power range.

This object is solved by a power supply comprising a DC voltage supply, a control unit and a plurality of high voltage channels. Each high voltage channel includes an inverter, a resonance circuit, a transformer unit, and a rectifier. The resonance circuit cooperates with the inverter. The inverter is formed by a first switching unit and a second switching unit whereby a voltage of a first polarity can be applied to the resonance circuit in a first switching state, whereas a voltage of a second polarity can be applied to the resonance circuit in a second switching state. The switching states can be switched by the control unit in such a manner that in a first mode of operation for high output power, the output power can be adjusted by changing the switching frequency in the range of the resonance frequency. In a second mode of operation for low output power, the output power can be adjusted by changing the duration of the switching state at an essentially constant switching frequency, which is at least a predetermined factor lower than the resonance frequency of the resonance circuit. The application of the two operating modes enables the inventive power supply to cover a large output power range.

In an embodiment of the invention the high voltage channels are identical. However, it may be advantageous that the plurality of high voltage channels comprises different channels, i.e. channels having different output power. This feature allows adapting the power supply to specific applications having special power requirements.

In another advantageous embodiment of the power supply the control unit switches the resonance circuits of different channels in a phase shifted manner. In this way the ripple of the output voltage is reduced.

In order to vary the output power, it is useful if the control unit is adapted to switch the resonance circuits with different frequencies. The variation of the switching frequency permits smooth transitions when high voltage channels are switched on or off.

In yet another embodiment of the inventive power supply the control unit is arranged to switch the resonance circuit in a pulse width modulation mode. In this operation mode it is possible to reduce the output power to low values.

According to a second aspect the present invention is related to a method for operating a high voltage power supply according to the first aspect of the invention. The inventive method according to the second aspect of the invention is related how to reduce the output power to low values.

According to the inventive method it is proposed to modulate one out of the plurality of high voltage channels at a fixed switching frequency by pulse width modulation while all other high voltage channels remain inactive. In this way it is possible to reduce the output power to very low values.

According to an improvement of the inventive method it has been found very useful to permute an active high voltage channel among the plurality of high voltage channels to allow for relatively long inactive periods of the previously active high voltage channel for cooling it down.

According to an advantageous embodiment of the inventive method it is proposed to measure the temperature of the active high voltage channel and to initiate the permutation of the high voltage channel if the measured temperature exceeds a predefined threshold temperature.

According to a modification of the inventive method it is suggested to initiate the permutation of the high voltage channels if the active high voltage channel has been operative for a predetermined period of time. Obviously, this modification does not require the presence of a temperature sensor.

BRIEF DESCRIPTION OF THE DRAWINGS

In attached drawings exemplary embodiments of the present invention are illustrated. In the Figures corresponding elements or components are labelled with the same or similar reference numbers. It shows.

DESCRIPTION OF PREFERRED EMBODIMENTS

Figure 1:
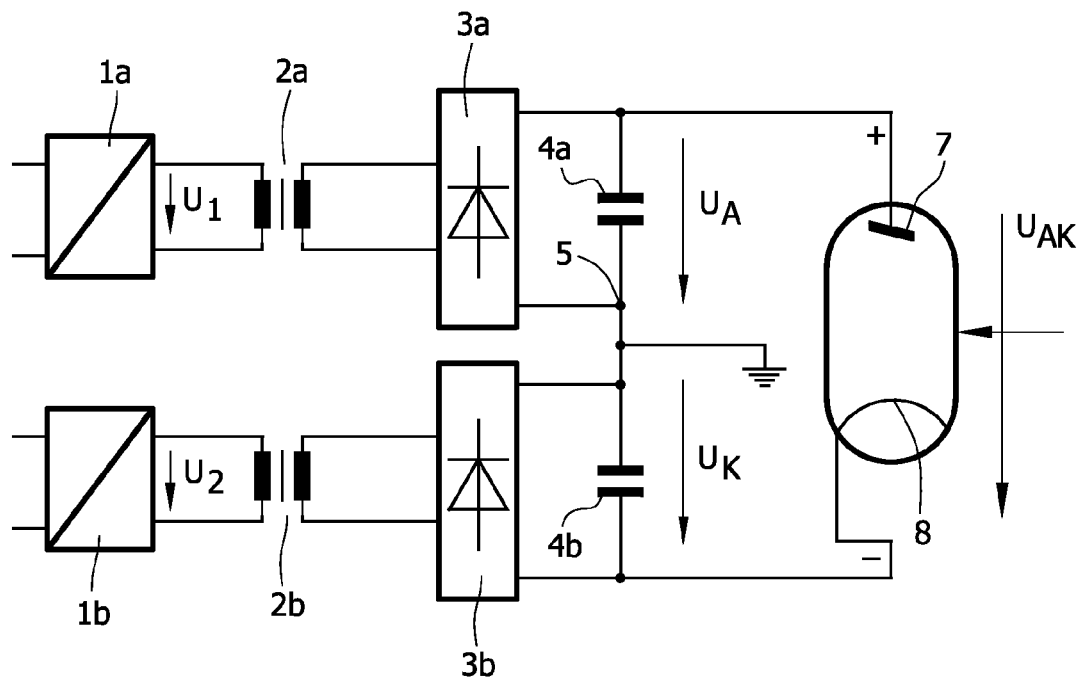
FIG. 1 a bi-polar high voltage power supply, known in the prior art.

In FIG. 1 an example of a bi-polar high voltage supply is shown. The bi-polar power supply includes two DC/AC converts 1a, 1b, each connected to the primary side of two separate transformers 2a, 2b. The secondary sides of the transformers 2a, 2b are each associated with a rectifier 3a, 3b provided with individual smoothening capacitors 4a and 4b. One pin of each smoothening capacitor 4a and 4b have a common connection point 5, which itself is connected to ground potential. The other pins of the capacitors 4a and 4b are connected to an x-ray tube 6. More specifically, the capacitor 4a is connected to the anode 7 of the x-ray tube 6 whereas the capacitor 4b is connected with the cathode 8 of the x-ray tube. The capacitors 4a and 4b provide voltages $U_A$ and $U_K$, respectively, having equal values but opposite signs. The voltages $U_A$ and $U_K$ build up the full anode cathode voltage $U_{AK}$. The value of the anode cathode voltage $U_{AK}$ is the sum of the values of $U_A$ and $U_K$. Apparently, in the bi-polar power supply the high anode cathode voltage $U_{AK}$ is split into two equal voltages $U_A$ and $U_K$, which are less difficult to insulate than the full anode-cathode voltage $U_{AK}$.

Figure 2:
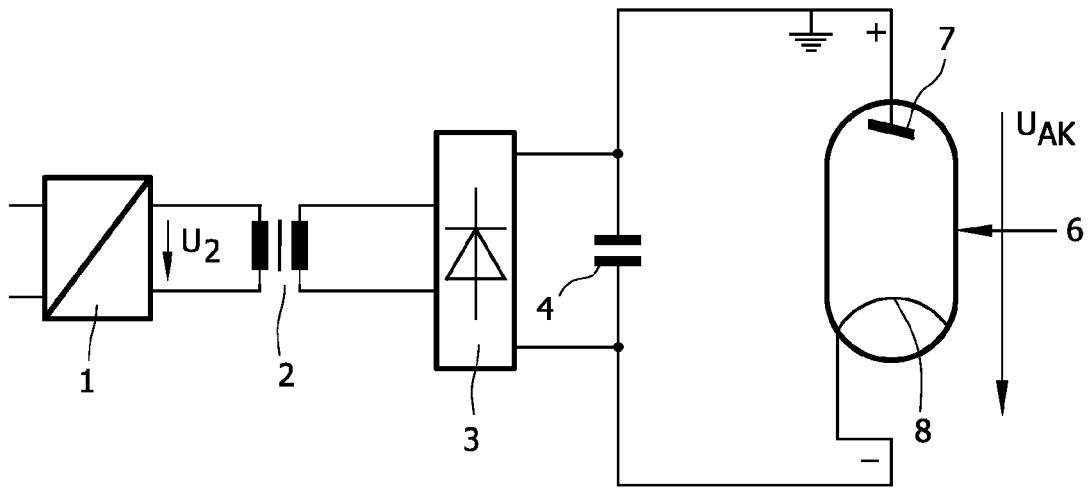
FIG. 2 a unipolar high voltage power supply known in the prior art.

FIG. 2 shows an example of a unipolar high voltage supply. The structure of the unipolar power supply of FIG. 2 is very similar to one half of the bi-polar power supply shown in FIG. 1. The unipolar power supply comprises a DC/AC converter 1, a transformer 2, a rectifier 3 and a smoothening capacitor 4. The pins of the capacitor 4 are connected to the anode 7 and the cathode 8 of the x-ray tube 6. Contrary to the bi-polar power supply the unipolar power supply provides the full anode cathode voltage $U_{AK}$.

Figure 3:
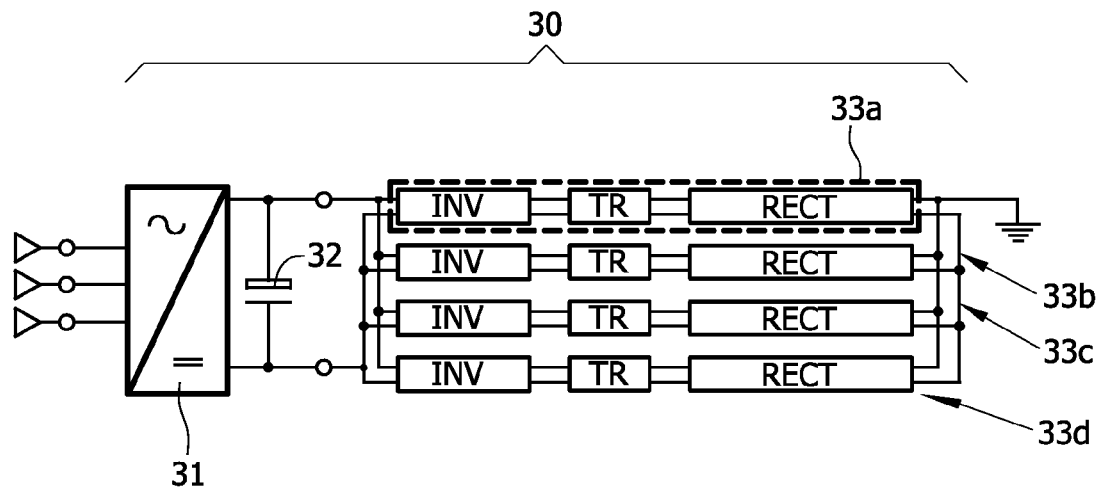
FIG. 3 a schematic circuit diagram of a power supply according to the invention having four high voltage channels, FIG. 4 a first topology of a high voltage channel of the power supply of FIG. 3, FIG. 5 a partial schematic circuit diagram of another embodiment of the invention, FIG. 6 a partial schematic circuit diagram of yet another embodiment of the invention, FIG. 7 a schematic circuit diagram of another power supply according to the invention having four high voltage channels, FIG. 8 a diagram illustrating the operating mode of the inventive power supply for different output currents, and FIG. 9 a diagram displaying the efficiency of the power supply as a function of its output power.

FIG. 3 shows a schematic circuit diagram of a power supply according to the present invention which is designated as a whole by a reference number 30. The power supply 30 comprises a mains rectifier 31 to rectify an AC mains voltage into a DC rail voltage. The DC rail voltage is provided at the outputs of the rectifier 31 and smoothened with a capacitor 32. The smoothened DC rail voltage is supplied to four high voltage channels 33a to 33d which will be described in greater detail below. The inputs of the high voltage channels 33a to 33d are connected in parallel to the DC rail voltage. The output of the high voltage channels 33a to 33d are connected in parallel and an x-ray tube (not shown). The structure of each high voltage channel 33a to 33d comprises an inverter INV, a transformer TR and a rectifier RECT. For illustrative purposes the high voltage channel 33a is enclosed by a dashed line in FIG. 3.

It will become obvious for a person skilled in the art that the invention is not limited to the use of four high voltage channels but in other embodiments of the invention the number of high voltage channels can be larger or smaller. In particular, another embodiment of the present invention comprises six high voltage channels.

Figure 4:
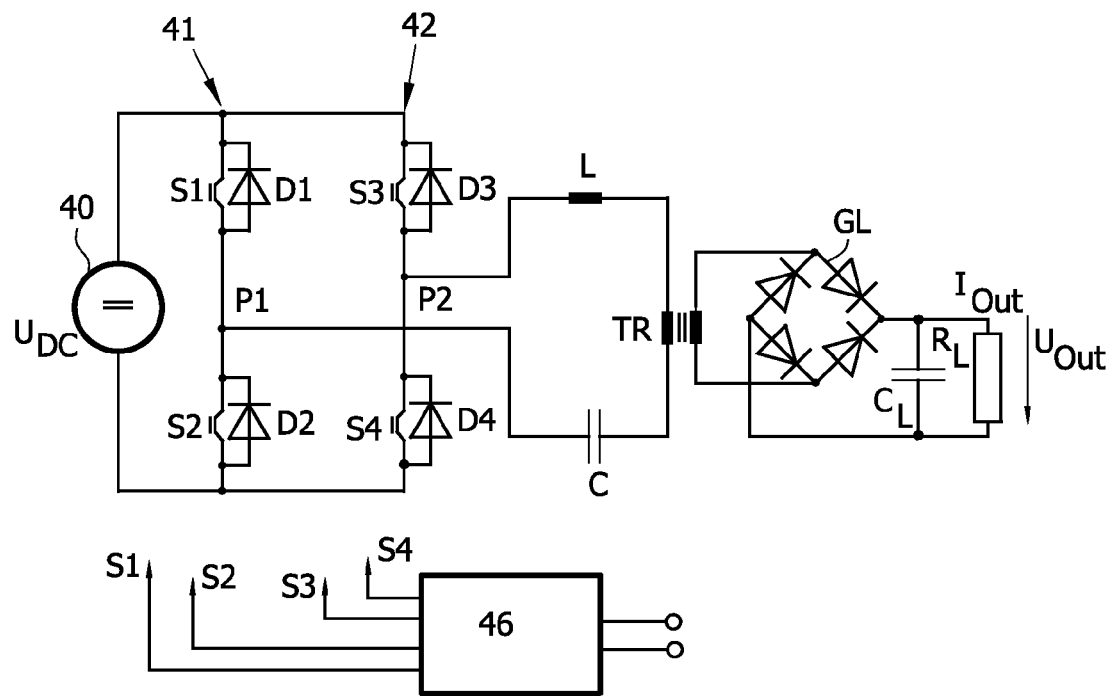

In FIG. 4 a schematic circuit diagram of one high voltage channel is illustrated. The DC rail voltage is symbolized as a DC voltage source 40 to which a first branch 41 and a second branch 42 of an inverter are connected in parallel. A first branch 41 includes a first semiconductor switch S1 and a second semiconductor switch S2 (e.g. switching transistors) which are connected in series. A first free running diode D1 and a second free running diode D2 are connected anti-parallel to the first and second semiconductor switch S1, S2, respectively. Correspondingly the second branch 42 is formed by a third semiconductor switch S3 and a fourth semiconductor switch S4 which are connected series. A third and a fourth free running diode D3 and D4 are connected anti-parallel to the third and fourth semiconductor switches. The junction of the first and the second semiconductor switch S1, S2 constitutes a first output terminal P1 of the inverter. A second output terminal P2 of the inverter is branched from the junction of the third and fourth semiconductor switches S3, S4.

The output terminals P1, P2 of the inverter are connected to a series resonance circuit which is formed by an inductance L as well as a capacitance C connected in series therewith. The inductance L and the capacitance C are connected to a primary winding of the transformer TR. A secondary winding of the transformer TR is connected with the inputs of a bridge rectifier $G_L$. The outputs of the bridge rectifier $G_L$ are connected to a load $R_L$ and a smoothening capacitor $C_L$. The load $R_L$ and the smoothening capacitor $C_L$ are connected in parallel. The load $R_L$ is provided with an output current Iout at an output voltage Uout.

A programmable control unit 46 generates switching signals for each pair of switches S1/S2 and S2/S3, which switching signals alternatively switch these pairs to the conductive state and the blocked state so that respective square wave voltages of alternating polarity are present on first and second output terminal P1, P2 of the inverter. The square wave voltages constitute a resonant tank voltage $U_{tank}$ for the resonant circuit. This circuit allows to modulate the amplitude of the output DC voltage by a pulse frequency modulation (PFM) of the inverter.

Figure 5:
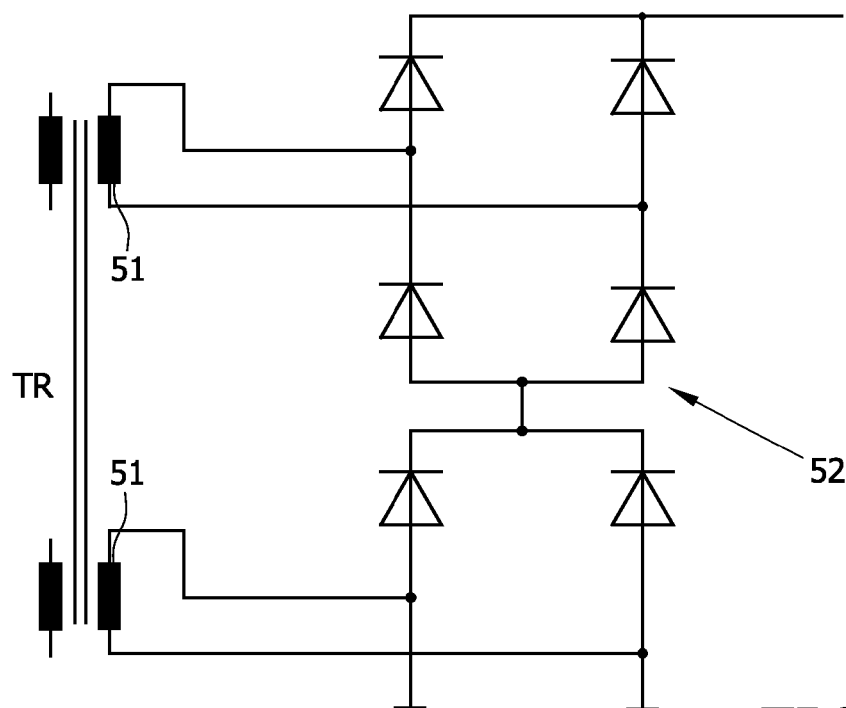

FIG. 5 shows a part of the circuit structure of another embodiment of the invention. One transformer TR has two secondary windings 51, which are coupled in series by a Graetz bridge 52.

Figure 6:
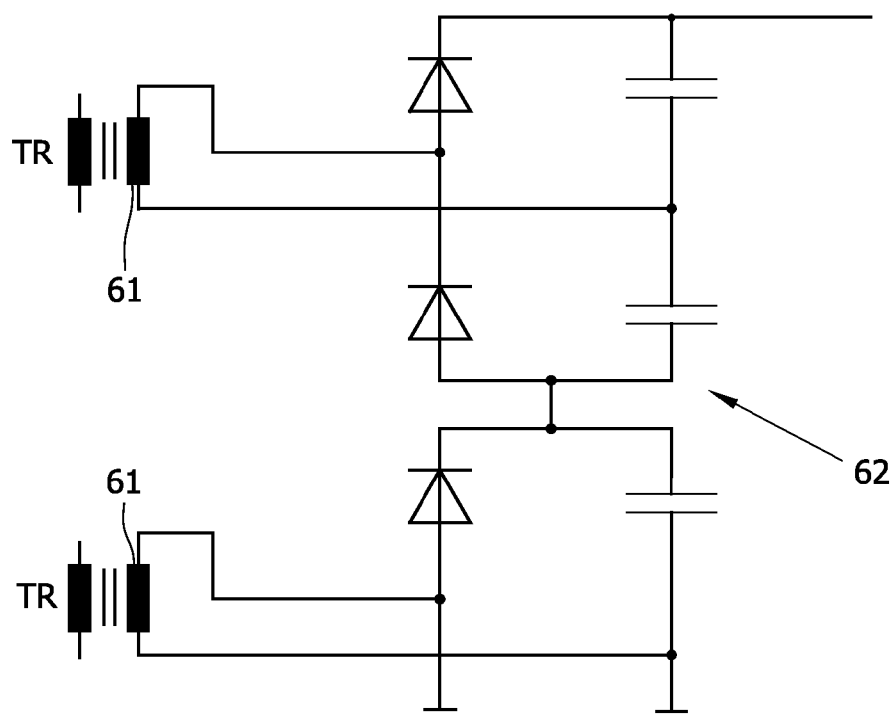

FIG. 6 shows a part of the circuit structure of yet another embodiment of the present invention. This embodiment is provided with two transformers TR each of which has one secondary winding 61. The secondary windings 61 are coupled in parallel via voltage doublers 62.

Figure 7:
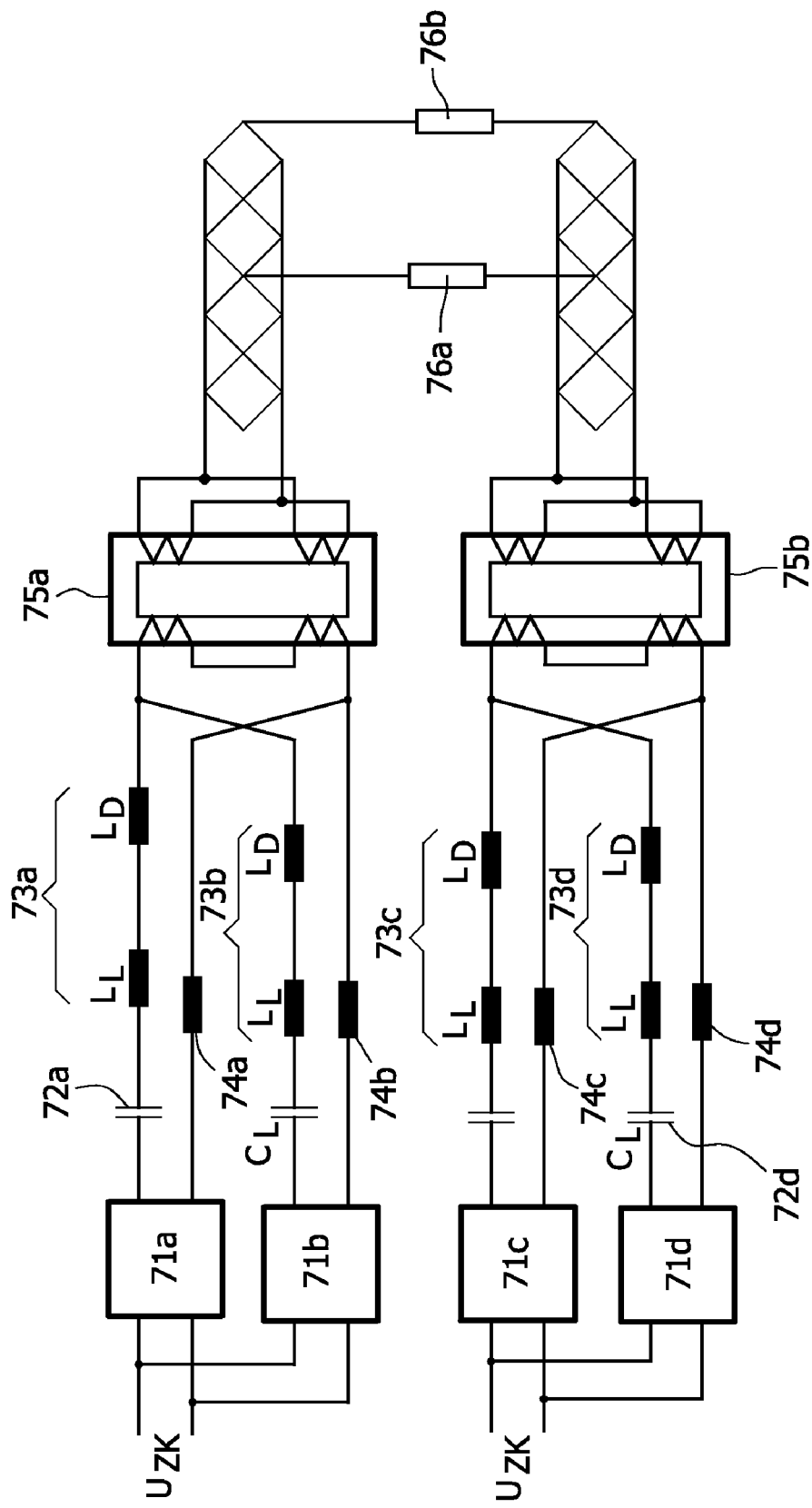

For some applications higher output powers may be necessary than a single converter can provide. Several inverters 71a to 71d are connected to a high performing DC voltage source as it shown in FIG. 7. In this example two pairs of inverters 71a to 71d are connected to two separate intermediate voltages $U_{ZK}$ provided by DC voltage sources not shown in FIG. 7. Each of the inverters 71a to 71d supplies a resonant load circuit composed of capacitive an inductive and ohmic component 72a, 73a, 74a to 72d, 73d, 74d. Each resonant circuit contains a transformer transforming the voltage to a higher level. As it is shown in FIG. 7 several resonance circuits may be connected to a single high voltage transformer 75a, 75b, respectively. The secondary currents of the transformers 75a, 75b are rectified by high voltage cascades 76a, 76b. As it is indicated in FIG. 7 the loads 77a, 77b are connected in parallel to the rectified of high voltage supplied by the high voltage cascades 76a, 76b. In a specific embodiment of the invention each cascade provides a power of 50 kW.

For the rectification it is known to a person skilled in the art that different types of rectifiers can be used for this purpose: a Graetz bridge, a Greinacher series multiplier, a cascade multiplier and a voltage doubler.

The total output power range of the inventive power supply is divided into several ranges. In the embodiment shown in FIG. 3 all high voltage channels are equally dimensioned and hence have the same output power. In this case the output power ranges are defined by the number of active high voltage channels. To provide the maximum output power all high voltage channels are operative. In the lowest output power range only a single high voltage channel is operative. The output power is increased by activating sequentially additional high voltage channels until all of the high voltage channels are active. Modulating the switching frequency permits to achieve smooth transitions during the switching of a high voltage channel as it will be described further below. Decreasing of the output power is performed by reversing this sequence, i.e. by sequentially switching off high voltage channels until only one single channel is still active.

A prerequisite for a circuit arrangement of similar high voltage channels is that for every value of the output high voltage a current range from maximum current Imax to Imax/2 can be covered with a control method known from WO01/37416. This method avoids significant switching losses in the power semiconductors. That means that the current waveform is composed of a full period and that the power semiconductors are switched on when the current amplitude equals zero and that the oscillation can decay naturally. There are no further active switching operations during the oscillation period. Under ideal conditions a single commutation takes place when the resonant current changes its sign: During the first half oscillation the active power semiconductors are carrying the current and when the sign of the current changes during the second half period the current commutes over to the diodes connected in an anti-parallel configuration (FIG. 4). This operation mode involves only minimal switching losses. In this output power range the power is controlled only by switching frequency variations.

It is desirable to cover a maximum portion of the total variable output power range with the PFM operation mode involving only minimal switching losses. Under the assumption of an approximately constant intermediate circuit voltage Uzk than in this operation method a defined output power can be transferred via a serial resonance circuit to the x-ray tube with a maximum switching frequency. The maximum switching frequency equals approximately 50% to 55% of the resonant frequency of the serial resonance circuit. The limitation is caused by the fact that the two subsequent resonant current oscillations must be zero. The proposed operation method suggests that the minimum switching frequency in this operation mode related to defined values of the input voltage $U_{ZK}$ and the output voltage Uout is less than 50% of the maximum switching frequency. Consequently the emission current of the x-ray tube and hence the output power can be reduced at most to 50%.

This type of operation allows to arrive at an identical operating point defined by a particular output voltage and output current (Uout, Iout) by using a single high voltage channel operating at a maximum output power or by two identical high voltage channels each operating only with half of the maximum output power. The operation of two independent similar channels has the further advantage that they can be operated with a certain amount of phase shift to reduce the ripple on the output voltage.

In practical embodiments of this concept it is important to provide for some overlap of the output power between the operation of a single channel with maximum output power and two channels with their minimum output power to allow for a smooth transition between the two different modes. This is shown in FIG. 8.

Figure 8:
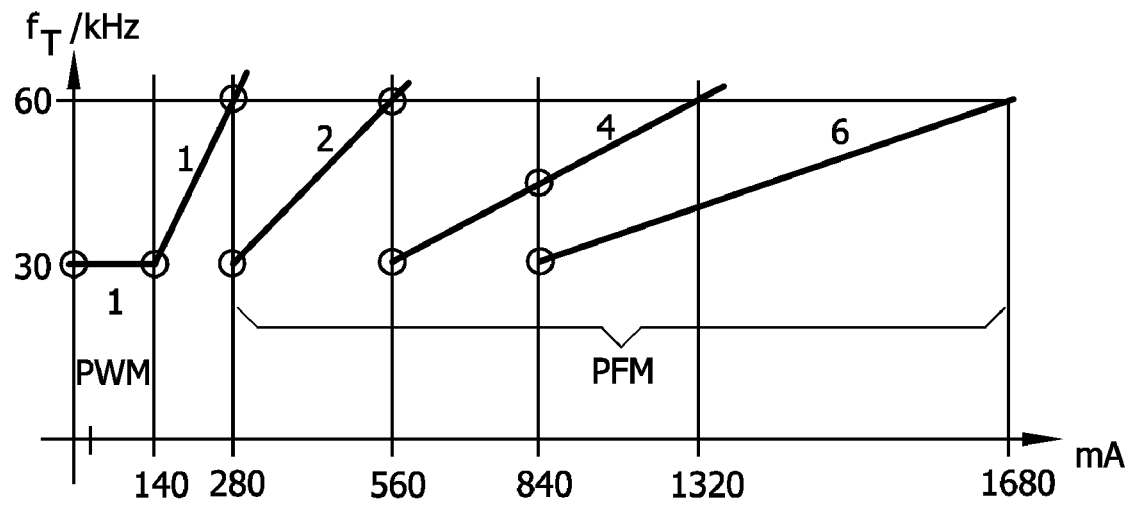

FIG. 8 shows a diagram with the output current on the abscissa and the switching frequency on the ordinate. The numbers in the diagram indicate the number of active high voltage channels. It is noted that the diagram refers to a power supply having six high voltage channels. But apart from that there is no principal difference to the embodiments shown in FIG. 3 and FIG. 7. In the output current range from 140 mA to 280 mA only a single high voltage channel is active. It can be seen that at an output current of 280 mA a second high voltage channel is switched on, while at the same time the switching frequency $f_T$ is reduced from 60 kHz to 30 kHz. To provide for higher output currents the switching frequency is increased again. At an output current of 560 mA the power supply is switched from two active to four active high voltage channels. Again the switching frequency is reduced from 60 kHz to 30 kHz. A last step occurs at an output current of 840 mA when the power supply switches from four to six active channels. However, in this case the switching frequency is reduced from 45 kHz only to 30 kHz. The reason is that contrary to the previous steps the number of high voltage channels does not double.

Also if the high voltage channels in other embodiments of the invention are not identical the switching frequency has to be changed in correspondence to the different output power of the high voltage channels to yield smooth transitions.

For increasing the output power the switching frequency may be increased until the current gap has become zero again or by activating one or more further channels and the adaptation of the switching frequency correspondingly. The term "current gap" refers to the PFM operation method described in WO 01/37416 A2. The maximum output power in this mode is achieved if all inverters are operated at the limit where their current gap has almost become zero. In the present embodiment this situation occurs at a switching frequency $f_T$ equal to 60 kHz.

If the switching frequency $f_T$ of one or several converters is increased beyond this point more power is transferred. However, in this operation mode significant switching dissipation takes place in the semiconductor switches and must be transported away in form of heat. As it is shown in FIG. 8 a very large part of the power range from 140 mA to 1680 mA output current can be controlled in PFM operation mode without incurring switching dissipation in the power semiconductors. Obviously, the output current range can be extended to even higher currents by further increasing the number of high voltage channels.

Contrary to that, sometimes it is necessary to operate an x-ray tube with very low currents that may be as low as O mA. This situation is shown on the left hand side in FIG. 8. As can be seen from the diagram the switching frequency remains constant at 30 kHz. Instead of further reducing the switching frequency a pulse width modulation for the converter with variable duty cycles is chosen. The low output power range is achieved by a switching off at least one power semiconductor during the first half oscillation when a current flows. Independent of the switching frequency the duty cycle can be adapted to the resonant period of the resonant circuit such that the output power can be reduced to zero. Modulating the duty cycle is known as pulse width modulation (PWM). Since in the PWM operation mode power is dissipated in the active semiconductors a low switching frequency is advantageous to reduce the power dissipation in the semiconductors. From 0 to 140 mA the output current is modulated by a PWM modulation whereas from 140 mA to 280 mA pulse frequency modulation (PFM) is applied.

In the operation mode with very low output power significant switching losses are generated. These dissipation losses must be transported away. The problem is aggravated by the fact that sometimes it is necessary to operate the high voltage source during relatively long periods with a low output power. Then it becomes difficult to handle the thermal load in a single high voltage channel. To alleviate the problem one preferred embodiment of the inventive power supply sequentially switches on and off different high voltage channels to allow them to cool down during relatively long inactive periods. In this way the expenses for cooling equipment like fans etc. can be reduced. During the switch over from one high voltage channel to another one smooth transitions in the output current can be achieved by phasing the currently active channel slowly out and slowly phasing in the other one, which was inactive before.

In one embodiment of the invention the permutation of the active high voltage channel is initiated after a predetermined period of time has elapsed. However, in another preferred embodiment a temperature sensor is provided to measure the temperature of the inverter, the transformer or the rectifier or any other temperature critical component of the active high voltage channel. In this embodiment the permutation is initiated if the measured temperature exceeds a predetermined threshold temperature. Any suitable and commercially available temperature sensor can be used for this purpose, e.g. a thermistor. The temperature sensor is not shown in the Figures.

Figure 9:
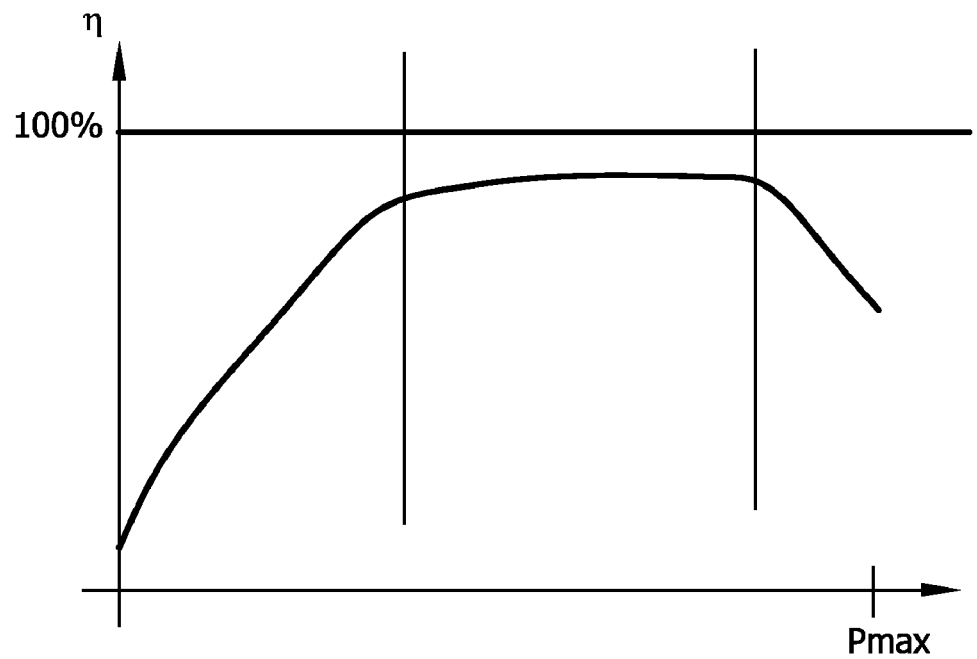

FIG. 9 displays the efficiency of a high voltage channel as a function of the output power. FIG. 7 reflects the operation areas of high and low dissipation in the power supply from the perspective of efficiency. The low efficiency in the low and high output power range corresponds to high dissipation losses whereas high efficiency corresponds to low dissipation losses. The preferred operation area with high efficiency is enclosed between two vertical lines in FIG. 7. Outside the preferred operation area significant switching losses occur.

Finally, it is noted that the reference symbols in the claims must not be understood to limit the scope of the claims. The reference symbols are merely provided to facilitate the understanding of the claims.

The invention claimed is:

1. A power supply comprising:
a DC voltage supply;
a control unit; and
a plurality of high voltage channels, wherein each high voltage channel includes an inverter, a resonance circuit, a transformer, and a rectifier, wherein the resonance circuit cooperates with the inverter, wherein the inverter includes a first switching unit and a second switching unit configured to apply (a)(i) a voltage of a first polarity to the resonance circuit in a first switching state and (a)(ii) a voltage of a second polarity to the resonance circuit in a second switching state, wherein the control unit switches the switching states in such a manner that (b)(i) in a first mode of operation for high output power, the output power of one or more of the plurality of high voltage channels is adjusted by changing the switching frequency ($f_T$) in the range of the resonance frequency, and (b)(ii) in a second mode of operation for low output power, the output power of only one of the plurality of high voltage channels is adjusted by changing the duration of the switching state at an essentially constant switching frequency while all other high voltage channels remain inactive, wherein the essentially constant switching frequency is at least a predetermined factor lower than the resonance frequency of the resonance circuit, wherein the power supply further includes a total output power range divided into a number of ranges, wherein each range is defined by a number of active high voltage channels of the plurality of high voltage channels, wherein the control unit is further configured to increase/decrease the output power of the power supply within the total output power range by (c)(i) activating/deactivating sequentially additional high voltage channels of the plurality of high voltage channels, (c)(ii) modulating a switching frequency of corresponding high voltage channels to achieve smooth transitions during the switching on/off, respectively, of each additional high voltage channel, and (c)(iii) providing overlap of the output power between ranges to allow for a further smooth transition between adjacent ranges.

2. The power supply according to claim 1, wherein the plurality of high voltage channels comprises channels of different types.

3. The power supply according to claim 1, wherein the control unit switches the resonance circuits of different channels in a phase shifted manner.

4. The power supply according to claim 1, wherein the control unit is adapted to switch the resonance circuits with different frequencies ($f_T$) for the first mode of operation.

5. The power supply according to claim 1, wherein the control unit is arranged to switch the resonance circuits in a pulse width modulation (PWM) mode for the second mode of operation.

6. A method for operating a power supply comprising a plurality of high voltage channels, the method comprising:
modulating one out of the plurality of high voltage channels at a fixed switching frequency by pulse width modulation while all other high voltage channels remain inactive for providing a low output power mode of operation; and
modulating one or more of the plurality of high voltage channels at a changing switching frequency by pulse frequency modulation for providing a high output power mode of operation, wherein a total output power range of the power supply is divided into a number of ranges, wherein each range is defined by a number of active high voltage channels of the plurality of high voltage channels, the method further comprising:
increasing/decreasing the output power of the power supply within the total output power range by (c)(i) activating/deactivating sequentially additional high voltage channels of the plurality of high voltage channels, (c)(ii) modulating a switching frequency of corresponding high voltage channels to achieve smooth transitions during the switching on/off, respectively, of each additional high voltage channel, and (c)(iii) providing overlap of the output power between ranges to allow for a further smooth transition between adjacent ranges.

7. The method according to claim 6, further comprising permuting an active high voltage channel among the plurality of high voltage channels in the low output power mode of operation.

8. The method according to claim 7, further comprising measuring a temperature of the active high voltage channel and initiating the permutation of the high voltage channel in response to the measured temperature exceeding a predefined threshold temperature.

9. The method according to claim 7, further comprising initiating the permutation of the high voltage channels in response to a determination that the active high voltage channel has been operative for a predetermined period of time.

* * * * *